W. SECK.
REVERSING DEVICE FOR COMBUSTION ENGINES.
APPLICATION FILED OCT. 6, 1909.
1,092,404.
Patented Apr. 7, 1914.
3 SHEETS—SHEET 2.
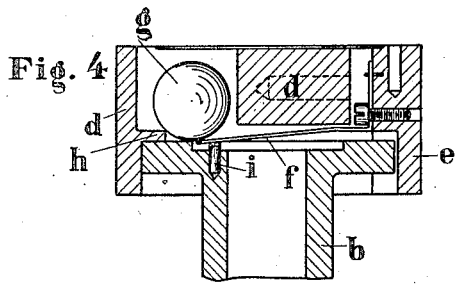
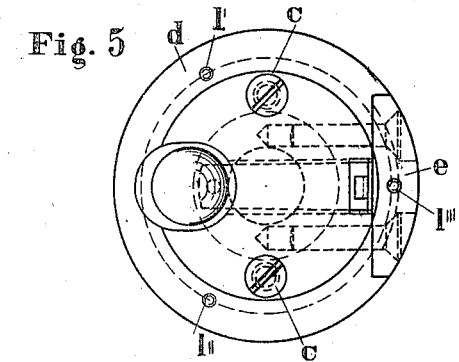
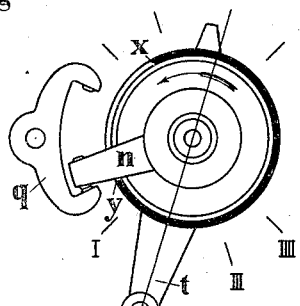
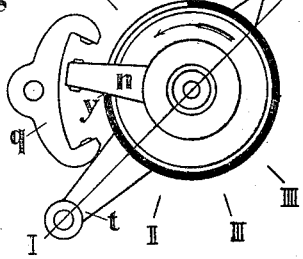
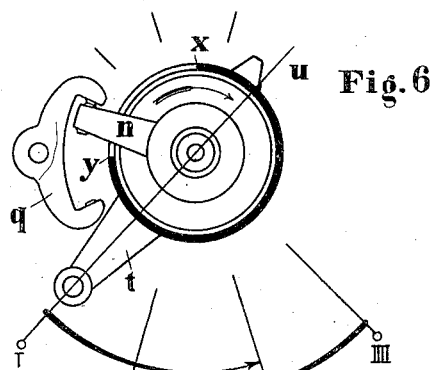
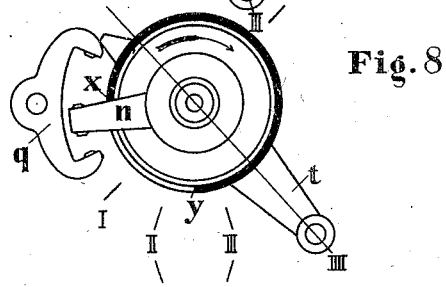
Witnesses:
W. P. Burke
A. F. Heuman
Inventor:
Willy Seck
By
M. Wallace White
Att'y

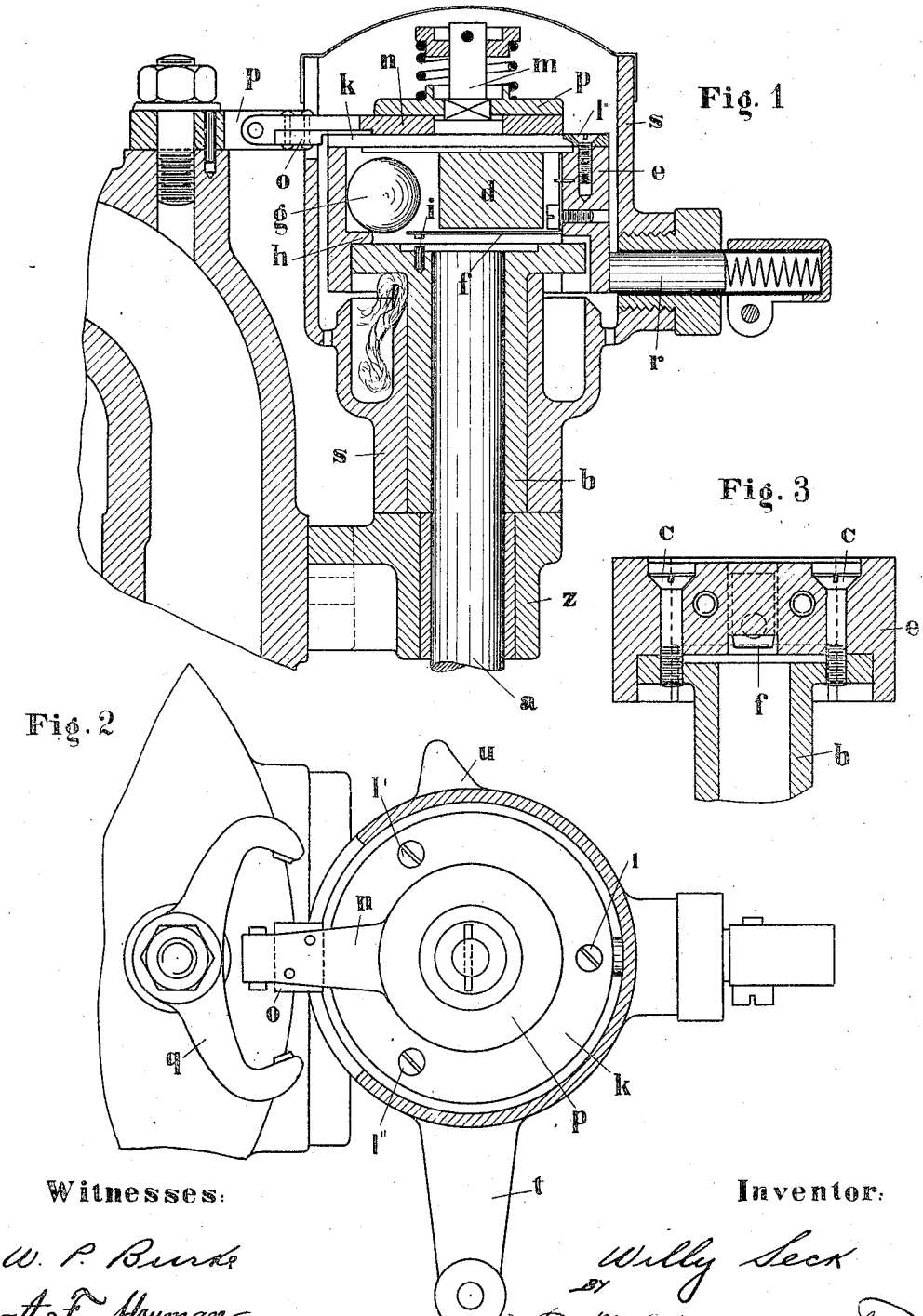

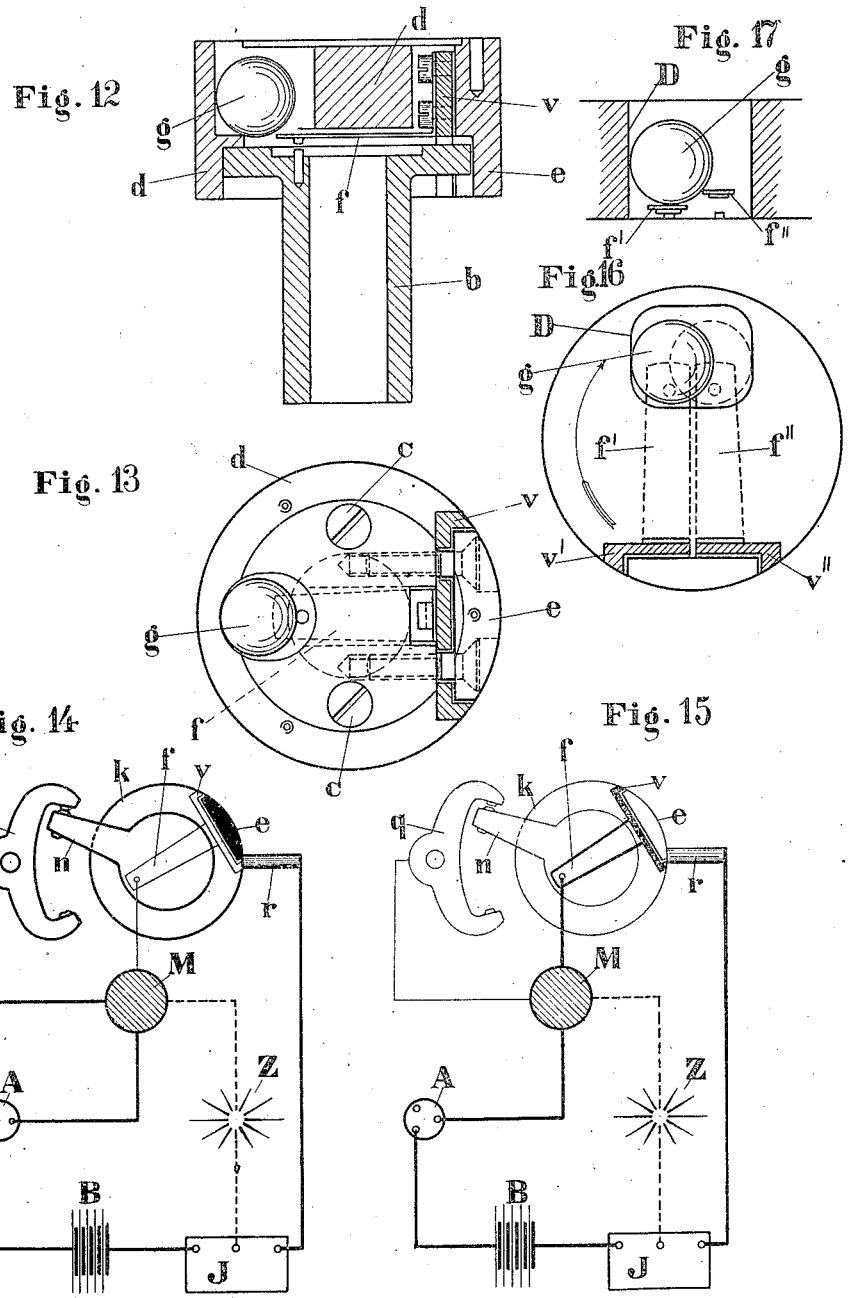

UNITED STATES PATENT OFFICE.

WILLY SECK, OF BERLIN-WILMERSDORF, GERMANY, ASSIGNOR TO THE FIRM OF ROBERT BOSCH, OF STUTTGART, GERMANY.

REVERSING DEVICE FOR COMBUSTION-ENGINES.

1,092,404.

Specification of Letters Patent.

Patented Apr. 7, 1914.

Application filed October 6, 1909. Serial No. 521,350.

*To all whom it may concern:*

Be it known that I, WILLY SECK, engineer, a citizen of the German Empire, residing at Helmstedterstrasse 6, Berlin-Wilmersdorf, Germany, do hereby declare that I have invented a new and useful Reversing Device for Combustion-Engines, the nature of which invention and in what manner the same is to be performed are particularly described and ascertained in and by the following statement.

In many instances where combustion engines are employed it is necessary for the machinery driven by such engines to reverse the direction of revolution, as is the use for instance with vehicles and vessels driven by motor power.

With two cycle motors it is possible as is known, to reverse the rotation of a running motor by great skill by restarting the ignition, which had been interrupted for stopping the engine, shortly before the engine comes to a full stop, after having previously brought the contactor into such a position, that the first of the renewed ignitions will occur so early as to reverse the piston before it has reached its inner-dead point and thus also reverse the direction of rotation of the crank shaft. With much practice this procedure will be successful in many instances; generally however the machine will be thereby unintentionally stopped. If the proper moment for restarting the ignition is not observed exactly, as if it be started too early, the counterpressure of the explosion produced may be just great enough to counteract and compensate the momentum of the moving masses, and not be sufficient to accelerate the same in the opposite direction: the machine will therefore come to a standstill. On the other hand one not sufficiently practised in this operation may also let the machine stop before even starting the ignition; which may easily occur by wrongly estimating the speed of the revolution. But even not considering the possible or to speak more correctly probable non-success, this method has the great disadvantage of requiring the whole attention of the attendant at a moment where he surely needs it for other purposes, as for steering or landing his boat. Furthermore for being able to properly observe the speed of the revolution of his engine, he must have a close access to the same without any obstruction or cover. These two requirements can hardly ever be met, wherefore only very few attempts have been made to avoid the use of reversing gears or swiveling blade propellers by reversing the engines employed in motor car or motor vessel construction.

The subject of the present invention is an arrangement for enabling a fully reliable reversing of combustion engines. For facilitating the description the arrangement is referred to in the hereinafter following description as attached to a two cycle engine; it may however also be attached to a four cycle engine, which is fitted with a valve gear suitable for this respective purpose.

Figure 1 is a vertical sectional view of the device in its running condition. Fig. 2 is a top plan view of the device, part being shown in section for the sake of clearness. Fig. 3 is a sectional view similar to Fig. 1 and at right angles thereto. Fig. 4 is a similar view to Fig. 1, the parts being shown as occupying their position when the device is running slowly or when it has ceased running. Fig. 5 is a plan view of Fig. 4. Figs. 6 to 11 inclusive represent the various positions which the parts occupy during the running and reversing of the motor. Figs. 12 and 13 are views similar to Figs. 4 and 5 showing a modified form. Figs. 14 and 15 are diagrammatic views. Fig. 16 is a view similar to Fig. 13, but showing another modification of the device, and Fig. 17 is a part sectional view of Fig. 16.

In Fig. 1 $a$ is the vertical contact shaft for the ignition driven from the crank shaft by means of two bevel gears, and running in a sleeve bearing $z$. At the upper end of this shaft and rigidly connected thereto is a flanged collar $b$ (Figs 1, 3, 4) on which the insulator $d$, (Figs. 1, 3, 4, 5) is secured by means of the two screws $c$ (Figs. 3, 5). The insulator $d$ is provided in known manner with a recess for receiving the contactor $e$ (Figs. 1, 4, 5), the latter being secured by means of two screws to the part $d$ (Fig. 5). As may be seen from the Figs. 1, 4 and 5 there is at no point a metallic contact between the member $b$ and the contactor $e$, so that the latter is entirely insulated from the mass of the engine.

By means of a screw and pin the flat spring $f$ provided with a platina contact is attached to the part $e$, said spring playing freely in a corresponding recess in the insulator d. Besides the recess mentioned, the part d has a further recess of oblong shape in a radial direction, which serves to receive the ball g. The lug h (Figs. 1, 4) projects into this recess and causes the ball g, when the engine is stopped or only running slowly, to roll toward the axis of rotation of the insulator d, as shown in Figs. 4 and 5. Under the weight of the ball g the spring f will bend down until its platina contact touches the platina stud i fitted in the flanged sleeve b whereby a conductive connection is effected between the flanged sleeve b and the contactor e. When the speed of the contact shaft a rises to or above a certain value, the ball g will, owing to centrifugal force, roll up on lug h (Fig. 1) thereby releasing spring f, which will now return into its original position and interrupt the contact at stud i. The ball g will remain in the position shown in Fig. 1 as long as the speed suffices to maintain the centrifugal force necessary therefor. The lug h is of such a shape that the ball will roll off only at a very low speed, shortly before the machine stops altogether.

On the insulator d is secured a cover disk k (Figs. 1, 2) by means of three screws (l', l'', l''') of which the one l''' is fitted in the contactor e and thus produces a metallic contact between the latter and the cover disk k. In the center of the latter is the shouldered stud m, the lowermost cylindrical portion of which serves as a center for the disk n which loosely engages the same. This disk is provided with an arm projecting to the left (Figs. 1, 2). By means of a spiral spring (Fig. 1) the disk p is forced against the disk n, the disk p having a square hole in its center, which engages a square section of the stud m.

When the shaft a revolves the disk n will owing to the friction against k and p be inclined to follow such rotation, but this movement is prevented by the fork q, which is provided on a suitable part of the engine (Fig. 2), and the two ends of which embrace the projecting arm of the disk n. As the fork q and the arm n serve to conduct a current from the mass of the motor to the contactor e which is in metallic contact with the disk n, the parts where the fork q and the disk n meet in contact are provided with non-oxidizable contact buttons. As the arm n will abut against one of the branches of the fork q as long as the engine is running a permanent good metallic connection between the mass and the contactor e is maintained. From the latter the current is conducted in known manner by means of a sliding contact r, such as shown in Figs. 1 and 2, to the ignition device. This sliding contact is, as usual, insulated from the housing s, which is cup shaped and incloses the whole attachment, to which it is secured. The housing can be rotated by means of a lever t centrally around the revolving central part in customary manner, for the purpose of varying moment of ignition.

The housing s covered at the top by a cap has at its one side a suitably dimensioned slot for the arm n to pass through. In order to prevent a metallic contact by the arm n striking against the sides of the slot, the respective part of the arm n carries a piece of insulating material riveted on.

In its lower portion the housing s forms a container for lubricant and provides all frictional parts with the same by means of a wick. In order to prevent the small particles which wear off from the sliding contact from getting into the lubricant, an annular groove is provided around the said container, in the bottom of which the small particles will fall and pass therefrom through a number of holes provided therein.

The above described arrangement permits an immediate reversing of the motor without taking into consideration whether it is running slowly or at a high speed, and without having to observe any precautions, merely by turning the housing s into one of its extreme positions. The two extreme positions are determined by the abutting of lever t or by abutting of the lug u (Figs. 2, 6–11) against fork q and can therefore be easily adjusted.

In Fig. 6 the principal positions of the housing s are indicated by Roman characters I, II, III, IV. For adjusting the ignition for the forward revolution of the motor the stroke of the lever between the limits I and III is employed, the position I corresponding to an ignition exactly at the dead point, whereby the shaft a is supposed to revolve in the direction of the clock. Consequently when the lever t is turned in the direction of the arrow marked "Forward" the ignition will have a lead and the speed of the engine will accordingly be increased. Position III corresponds to the maximum lead of the ignition. From Figs. 6 and 7 it is evident, that the width of the slots in the housing s has such a size, that its edges marked x and y will admit of the lever t being adjusted within the positions I and III, without the arm n coming in contact with either of the said edges x or y. If however the lever t is moved beyond the position III into the position IV shown in Fig. 8, the edge x will push the arm n forward and thereby interrupt the contact with the fork q. As thereupon the ignition will cease in the cylinder owing to lack of current, the speed of the motor will quickly drop and the latter would come entirely to a standstill if the ball g, which was held by centrifugal force until now in the position shown in Fig. 1, did not roll down from lug 4 and reach the position shown in Fig. 4. The current which is now interrupted between the arm $n$ and the fork $q$ has by means of the contact pin $i$ and the spring $f$ another conducting passage to the contactor $e$. The first of the renewed ignitions will owing to the increased lead of the ignition in consequence of the lever $t$ being in position IV, occur during the first half of the inward stroke of the piston, so that the latter must reverse its direction of travel before it has reached the dead point. Together with the crank shaft also the ignition contact shaft $a$ will be reversed. The arm $n$ will consequently leave the stop at $x$ and follow the rotation of shaft $a$ until it strikes against the end of the fork $q$. If now as the speed increases the ball $g$ is again moved to break the contact at the stud $i$, the current is conducted to the contactor $e$ in the same manner as during the forward rotation, over the fork $q$ and arm $n$; with the only difference that during the reversed rotation the other end of the fork, in the drawing the lower one, will conduct the current (Fig. 9). The position of the lever $t$, being the same in Fig. 9 as in Fig. 8 corresponds for the reversed rotation with an ignition spark at the upper dead point. The moment of the ignition is adjusted for the reversed rotation between the ultimate positions IV and II (Fig. 6) an advance of the lever $t$ in the direction of the arrow marked "Backward" increasing the lead of the ignition. At point II the maximum lead is reached, the stop $y$ of the slot in the housing being close to the arm $n$ without coming in contact with the same (Fig. 10). When the lever $t$ is turned beyond point II, into position I (Fig. 11) the arm $n$ is moved by the stop $y$ and the contact between the arm $n$ and the fork $q$ is interrupted. The reversing of the direction of rotation of the machine is now effected in exactly the same manner as hereinbefore described for the forward rotation.

Instead of the ball $g$ of course any other suitable means may be employed, which will under action of the centrifugal force interrupt an existing circuit. Also the automatic reclosing of the circuit, interrupted during the reversing may be obtained after the direction of rotation of the engine has been reversed by other means than those specified in the description.

In the design hereinbefore described the rolling down of the ball merely depends on a certain speed of rotation and not on the relative angular position of the fiber part $d$ to the sliding contact $r$. In the former instance the ball produces a contact only at the stud $i$, whereas the circuit is closed only when the sliding contact $r$ is reached by the contactor $e$, at a predetermined relative angular position of the crank shaft running synchronously with the fiber part $d$. If the ball rolls down however only after the parts $e$ and $r$ have met in contact the circuit is closed at any moment during the contact period between the parts $e$ and $r$. Hereby however the closing of the circuit may be retarded in such a manner that the ignition occurs at a position of the piston unsuitable for the reversing of the engine. For if the contactor $e$ meets the slip contact $r$ when the crank is under an angle of 60° to the dead point, the contact will cease only at the dead point, as the period of contact must for practical reasons extend over a travel of the crank around an angle of 60°. If the ball rolls down at a position of the crank of 20° before the dead point the ignition, which for a reliable effect should occur at about 60 to 35° before the dead point, will be too late and the machine will probably stand still. This probability amounts however only to 1:12, so that the reliability of the effect remains considerable and is sufficient in most instances.

For obtaining an absolute security for many other purposes the following device has been designed: As may be seen from Figs. 12 and 13 the contactor $e$ is fitted in a U-shaped metallic part $v$ from which it is insulated. The elements $e$ and $v$ are secured by means of two screws to the fiber part $d$. The metallic part $v$ has two projections lying on opposite sides of the part $e$ and these projections extend flush with the cylindrical circumference of the fiber part $d$, whereby the part $v$ forms by itself a contactor. To this contact piece is attached the spring $f$, which, as the part $v$ is insulated from the part $e$, will contrary to the hereinbefore described design, have no metallic connection with the latter. The contactor $e$ is as previously, conductively connected by means of a screw $l$ (Fig. 1) with the cap $k$, the latter not coming in contact with the contact piece $v$, as will be evident from Fig. 12. The current can thus be conducted from the mass of the engine to the contactor $e$ merely through the cap $k$ over the parts $n$ and $q$ (Fig. 1) while the current can flow to the contact piece $v$ only through the spring $f$ over the contact stud $i$. During the ordinary run of the engine the contact piece $v$ will be without current, as the ignition current is conducted over the contactor $e$. Only when for the purpose of reversing the engine, the ignition circuit is interrupted between the parts $q$ and $n$, the part $v$ will receive a current after the ball $g$ has rolled down in consequence of the speed having dropped sufficiently.

In Figs. 14 and 15 the flow of the current in the two just described instances is illustrated, the live parts, through which the current flows being marked with thick lines, the parts with no current being shown with thin lines. In both figures B is the source of current, J the induction apparatus, M the mass, A a switch between the mass and the source of current. Z is the ignition plug inserted in the secondary circuit. The other letters correspond with the same letters in the other figures.

Fig. 14 illustrates the connections during the ordinary run of the engine. From the mass the current flows to the slip contact $r$ over the parts $q$, $n$, $k$ and $e$ while the part $v$ remains without current.

In Fig. 15 showing the connections during reversing, the current flows from M over the parts $f$ and $v$ to the part $r$. As thereby the contact between $o$ and $n$ is interrupted, no current can flow to the part $e$.

The above described arrangement has the peculiar feature that it will prevent the ignition occurring at an unsuitable position of the crank, by preventing the circuit from being closed by the ball rolling down as long as the parts $e$ and $r$ are in contact.

As may be seen from Figs. 13 and 15 two current impulses will reach the contact piece $v$ during each revolution. In the reversing positions of the housing $s$, as shown in Figs. 8 and 11, the one impulse will occur at an angle of the crank to the dead point of 60°, while the other impulse will meet exactly with the dead point. If the ball rolls down while the part $r$ is gliding on the fiber the front leg of $v$ (with relation to the sense of rotation) will first close the circuit with the slip contact $r$. In consequence thereof the ignition will take place at 60° ahead of the dead point and the machine will be reversed. If however the ball rolls down while the parts $r$ and $e$ are in contact, the rear leg of the part $v$ will first close the circuit. Even if the ignition now occurring somewhat behind the dead point, gives the fly wheel a fresh impulse in the same directions of rotation, as it had until then, the acceleration owing to the considerably belated ignition is so small, that the following ignition, which occurs at 60° ahead of the dead point will certainly reverse the engine. Even such ignition in the dead point position may be avoided by simple means. If, as shown in Fig. 16, the contact piece $v$ is divided into two parts $v'$ and $v''$, which are not in metallic contact with each other, and each of these parts is provided with a contact spring, of the kind as described above, it only need be arranged that the ball on reversing will conduct current to one of these halves only, and always to the forward one, with relation to the direction of rotation. This is very easily obtained by widening the recess provided in the fiber part $d$ for the ball (cfr. Figs. 16 and 17). As during the running of the engine the ball will always be lying against the rear wall of the recess, with relation to the direction of rotation (see arrow) it will rise on the contact spring $f'$ of the rear contact piece $v$ with relation to the direction of rotation (Figs. 16 and 17); when the direction of rotation is reversed, the ball $g$ must roll against the opposite wall of the recess, thus resting on the spring $f''$.

Having thus described my invention, what I claim and desire to secure by Letters Patent of the United States is:

1. In a combustion engine, in combination, a timer shaft adapted to be driven by the engine, a circuit-controlling contact carried thereby, a circuit-controlling spring electrically connected to said circuit-controlling contact, said spring normally occupying its open circuit position, a movable member normally out of engagement with said spring and adapted when the speed of the engine passes below a predetermined value to move into engagement with said spring to cause the latter to occupy its circuit closing position, a rotatable circuit-controlling member electrically connected to said circuit-controlling contact, manually operated means to move said circuit-controlling member to cause it to break its circuit and automatically operated means for causing said member to close its circuit when the direction of rotation of said timer shaft is reversed.

2. In a combustion engine, in combination, a timer shaft adapted to be driven by the engine, a circuit-controlling contact carried thereby, a circuit-controlling spring electrically connected to said circuit-controlling contact, said spring normally occupying its open circuit position, a movable member normally out of engagement with said spring and adapted when the speed of the engine passes below a predetermined value to move into engagement with said spring to cause the latter to occupy its circuit closing position, a rotatable circuit-controlling member electrically connected to said circuit-controlling contact, a fork-shaped contact piece provided with two stops adapted to be electrically engaged by said member depending upon the direction of rotation of said timer shaft, manually operated means to move said circuit-controlling member to cause it to break its circuit and automatically operated means for causing said member to close its circuit when the direction of rotation of said timer shaft is reversed.

3. In a combustion engine, in combination, a timer shaft adapted to be driven by the engine, a circuit-controlling contact carried thereby, a circuit-controlling spring electrically connected to said circuit-controlling contact, said spring normally occupying its open circuit position, a movable member normally out of engagement with said spring and adapted when the speed of the engine passes below a predetermined value to move into engagement with said spring to cause the latter to occupy its circuit closing position, a contact lever rotatably secured to the timer shaft, means tending to rotate said lever with said shaft, a fork-shaped contact piece provided in the ignition system and provided with two stops for engaging the contact lever and preventing rotation thereof and manually operated means to move said contact lever to cause it to break its circuit.

4. In a combustion engine, in combination, a timer shaft adapted to be driven by the engine, a circuit-controlling contact carried thereby, a circuit-controlling spring electrically connected to said circuit-controlling contact, a movable member normally out of engagement with said spring and adapted when the speed of the engine passes below a predetermined value to move into engagement with said spring to cause the latter to occupy its circuit closing position, a contact lever rotatably secured to the timer shaft, means tending to rotate said lever with said said shaft, and a fork-shaped contact piece provided in the ignition system and provided with two stops for engaging the contact lever and preventing rotation thereof, said device having a rotatively adjustable case for removing the contact lever from the stop when the case is adjusted into the reversing position.

5. In a combustion engine, in combination, a timer shaft adapted to be driven by the engine, an electrical contact carried thereby, a pair of electrical contacts carried by said shaft, said pair being insulated from said first mentioned contact and from each other, spring contacts connected to said pair of contacts, contact points adapted to be engaged by said spring contacts, and a ball adapted to engage one or the other of said springs according to the direction of rotation of said shaft to cause the engaged spring to move into contact with its associated contact point.

In witness whereof I have hereunto set my hand this twenty-first day of September 1909 in the presence of two subscribing witnesses.

WILLY SECK.

Witnesses:
HENRY HASPER,
WOLDEMAR HAUPT.

Copies of this patent may be obtained for five cents each, by addressing the "Commissioner of Patents, Washington, D. C."